(12) United States Patent
Kurokawa et al.

(10) Patent No.: US 8,985,168 B2
(45) Date of Patent: Mar. 24, 2015

(54) PNEUMATIC TIRE WITH TREAD HAVING SIPES WITH EXPANDED DIAMETER SECTIONS

(75) Inventors: Makoto Kurokawa, Kodaira (JP); Takeshi Iwatani, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 69 days.

(21) Appl. No.: 13/502,842

(22) PCT Filed: Oct. 19, 2010

(86) PCT No.: PCT/JP2010/068318
§ 371 (c)(1),
(2), (4) Date: May 31, 2012

(87) PCT Pub. No.: WO2011/049062
PCT Pub. Date: Apr. 28, 2011

(65) Prior Publication Data
US 2012/0234443 A1  Sep. 20, 2012

(30) Foreign Application Priority Data

Oct. 20, 2009  (JP) ................................. 2009-241439
Nov. 18, 2009  (JP) ................................. 2009-263281

(51) Int. Cl.
B60C 11/12  (2006.01)
B60C 11/11  (2006.01)

(52) U.S. Cl.
CPC ..... *B60C 11/1281* (2013.01); *B60C 2011/1209* (2013.01); *B60C 2011/1213* (2013.01); *B60C 11/11* (2013.01); *Y10S 152/03* (2013.01)
USPC ................................. 152/209.18; 152/DIG. 3

(58) Field of Classification Search
CPC ............ B60C 11/1218; B60C 11/1222; B60C 11/1272; B60C 11/1281; B60C 2011/1227
USPC ................................ 152/DIG. 3, 902, 209.18
IPC ......................................................... B60C 11/12
See application file for complete search history.

(56) References Cited

FOREIGN PATENT DOCUMENTS

| CN | 1853965 A | 11/2006 |
|----|-----------|---------|
| DE | 737817 C | 7/1943 |
| JP | 02-267009 A | 10/1990 |

(Continued)

OTHER PUBLICATIONS

Machine Translation: JP2006-298057; Yamanishi, Teruaki; (No Date).*

(Continued)

*Primary Examiner* — Steven D Maki
*Assistant Examiner* — Kendra Shin
(74) *Attorney, Agent, or Firm* — Sughrue Mion, PLLC (57) ABSTRACT

A pneumatic tire according to the present invention includes a tread section provided with circumferential grooves extending in a tire circumferential direction, lateral grooves extending in a tread width direction, and a plurality of land blocks defined by the circumferential grooves and the lateral grooves, each of the land blocks provided with sipes formed to extend to a predetermined depth from a tread surface inward in a tire radial direction, each of the sipes having an end portion communicating with at least any one of the circumferential grooves and the lateral grooves. At least one of the plurality of sipes includes an expanded diameter section on an inner end in the tire radial direction, and the expanded diameter section is formed to increase in diameter extending toward each of sidewalls of the land block.

9 Claims, 12 Drawing Sheets

(56) References Cited

FOREIGN PATENT DOCUMENTS

| | | | | |
|---|---|---|---|---|
| JP | 03-001910 A | | 1/1991 | |
| JP | 03128706 A | * | 5/1991 | ............. B60C 11/02 |
| JP | 07-228108 A | | 8/1995 | |
| JP | 2005-193815 A | | 7/2005 | |
| JP | 2006-051863 A | | 2/2006 | |
| JP | 2006-082651 A | | 3/2006 | |
| JP | 2006-298057 A | | 11/2006 | |
| JP | 2006298057 A | * | 11/2006 | ............. B60C 11/12 |
| JP | 2009149297 A | * | 7/2009 | ............. B60C 11/12 |

OTHER PUBLICATIONS

Machine Translation: JP2009-149297; Scheuren, Daniel; (No Date).*
Summary: JP03-128706, Kondo, Takanori, (no date).*
Extended European Search Report, dated May 10, 2013, issued in corresponding European Patent Application No. 10824911.1.
International Search Report of PCT/JP2010/068318 dated Jan. 25, 2011.
Official Action Letter, dated Dec. 2, 2013, issued in counterpart Chinese Patent Application No. 201080047584.8.

* cited by examiner

PNEUMATIC TIRE WITH TREAD HAVING SIPES WITH EXPANDED DIAMETER SECTIONS

CROSS REFERENCE TO RELATED APPLICATIONS

This application is a National Stage of International Application No. PCT/JP2010/068318 filed Oct. 19, 2010, claiming priority based on Japanese Patent Application Nos. 2009-241439 filed Oct. 20, 2009 and 2009-263281 filed Nov. 18, 2009, the contents of all of which are incorporated herein by reference in their entirety.

TECHNICAL FIELD

The present invention relates to a pneumatic tire, and more specifically to a pneumatic tire having multiple sipes formed in each of land blocks.

BACKGROUND ART

Conventionally, a pneumatic tire has been known in which circumferential grooves and lateral grooves are formed in a tread section, and multiple land blocks are defined by the circumferential grooves and the lateral grooves. Multiple sipes (microgrooves) are formed in each of the land blocks to improve tire performance on ice (refer to Patent Document 1, for example). The sipes described in Patent Document 1 each extend from a tread surface of the land block inward in the radial direction, and are provided with an expanded diameter section at a depth ranging from 20% to 90% of the depth of the sipe.

PRIOR ART DOCUMENT

Patent Document

Patent Document 1: Japanese Patent Application Publication No. 2006-298057

SUMMARY OF THE INVENTION

However, the sipes of a conventional structure are each provided with the expanded diameter section formed at a depth ranging from 20% to 90% of the sipe depth, and thus a drainage function of draining water absorbed from an icy road surface by the sipes of the tire during travelling on the icy road surface may be lowered.

An object of the present invention is to provide a pneumatic tire having a high drainage function while keeping a crack prevention effect of the sipe.

The first feature of the present invention is summarized as a pneumatic tire including a tread section provided with circumferential grooves (circumferential grooves 2 to 4) extending in a tire circumferential direction, lateral grooves (lateral grooves 5, 6) extending in a tread width direction, and a plurality of land blocks (land blocks 7) defined by the circumferential grooves and the lateral grooves, each of the land blocks provided with sipes (sipes 8) formed to extend to a predetermined depth from a tread surface inward in a tire radial direction, each of the sipes having an end portion communicating with at least any one of the circumferential grooves and the lateral grooves, wherein at least one of the plurality of sipes includes an expanded diameter section (expanded diameter section 10) on an inner end of the sipe in the tire radial direction, and the expanded diameter section is formed to increase in diameter extending toward each of sidewalls of the land block.

According to the feature described above, the expanded diameter section is formed not in an intermediate portion in the depth direction of the sipe but in the inner end portion in the radial direction, and thus occurrence of a crack is prevented even when a load is inputted to the sipe at the time of tire rolling as well as a drainage effect is obtained when travelling on icy roads. Moreover, the expanded diameter section increases in diameter extending toward each of the sidewalls of the land block, and thus the effect of draining water from the end portions of the expanded diameter section in the longitudinal direction thereof is improved. As described above, according to the present invention, the drainage effect and the crack prevention effect of the sipe are achieved at the same time.

Another feature is summarized as the sipe extending in the tread width direction.

Another feature is summarized as the sipe extending in the tire circumferential direction.

The second feature of the present invention is summarized as a pneumatic tire (pneumatic tire 201) including a plurality of land blocks (land blocks 208) defined by circumferential grooves (circumferential grooves 202 to 205) extending in a tire circumferential direction and lateral grooves (lateral grooves 206, 207) extending in a tread width direction, each of the land blocks provided with a plurality of sipes (expanded diameter sipe 209 and general sipes 210) formed to extend to a predetermined depth from a tread surface inward in a tire radial direction, each of the sipes having an end portion communicating with at least any one of the circumferential grooves and the lateral grooves, at least one of the plurality of sipes including an expanded diameter section (expanded diameter section 212) on an inner end of the sipe in the tire radial direction, the expanded diameter section formed by increasing a width of the sipe, wherein in a bottom portion of the sipe, a shallow bottom portion (shallow bottom portion 214) where the depth of the sips is smallest is formed in a center portion of the sipe in a longitudinal direction thereof, and the expanded diameter section extends from the shallow bottom portion toward each of sidewalls of the land block, and increases in size extending from the shallow bottom portion toward each of the sidewalls of the land block.

According to the feature described above, the expanded diameter sipe includes the expanded diameter section formed by increasing the sipe width on the inner end of the sipe in the tire radial direction. Thus, compared with a sipe having no expanded diameter section, rainwater and the like between the icy road surface and the tread surface are easily absorbed in the expanded diameter section. In other words, absorption function is improved.

In addition, in the bottom portion of the expanded diameter sipe, the shallow bottom portion where the depth of the sips is smallest is formed in the center portion of the expanded diameter sipe in the longitudinal direction thereof. Thus, rainwater and the like stored in the center portion easily flow from the shallow bottom portion toward the sidewalls of the land block, and thereby the drainage function is improved. In addition, the rigidity of the land block around the center portion in the longitudinal direction thereof is improved, and thereby also improving tire performance on ice (various travelling performances such as drivability and drive/braking performance).

Moreover, the expanded diameter section increases in diameter extending from the shallow bottom portion toward each of the sidewalls of the land block. Thus, the expanded diameter section is made smaller in diameter at the center portion in the longitudinal direction thereof than at the both end sides thereof, and thereby increasing hydraulic pressure at the center portion compared with the both end sides when the expanded diameter sipe absorbs rainwater and the like. Accordingly, the rainwater and the like absorbed in the expanded diameter section flow to the both end sides to be drained, and thereby more surely improving drainage function.

As described above, the pneumatic tire can be provided which achieves absorption function and drainage function at a high level at the same time as well as improves tire performance on ice.

Another feature is summarized as, as the expanded diameter section extends from the shallow bottom portion toward the sidewall of the land block, the sipe depth gradually becoming larger.

Another feature is summarized as the sipe (expanded diameter sips 209) extending in the tread width direction.

Another feature is summarized as the sipe (expanded diameter sipe 209) extending in the tire circumferential direction.

Another feature is summarized as the expanded diameter section gradually increasing in diameter extending from the shallow bottom portion toward each of the sidewalls of the land block.

Another feature is summarized as the expanded diameter section shaped like a circle in a cross section intersecting at right angles a longitudinal direction of the sipe in a plan view of the tread surface.

MODES FOR CARRYING OUT THE INVENTION

Hereinafter, a pneumatic tire according to the present invention is described in detail on the basis of the drawings. It should be noted that the drawings are schematic and thicknesses of material layers, ratios thereof and the like are different from actual ones. Therefore, specific thicknesses and dimensions should be determined in consideration of the following description. Moreover, the drawings also include portions having different dimensional relationships and ratios from one another.

[First Embodiment]

Figure 1:
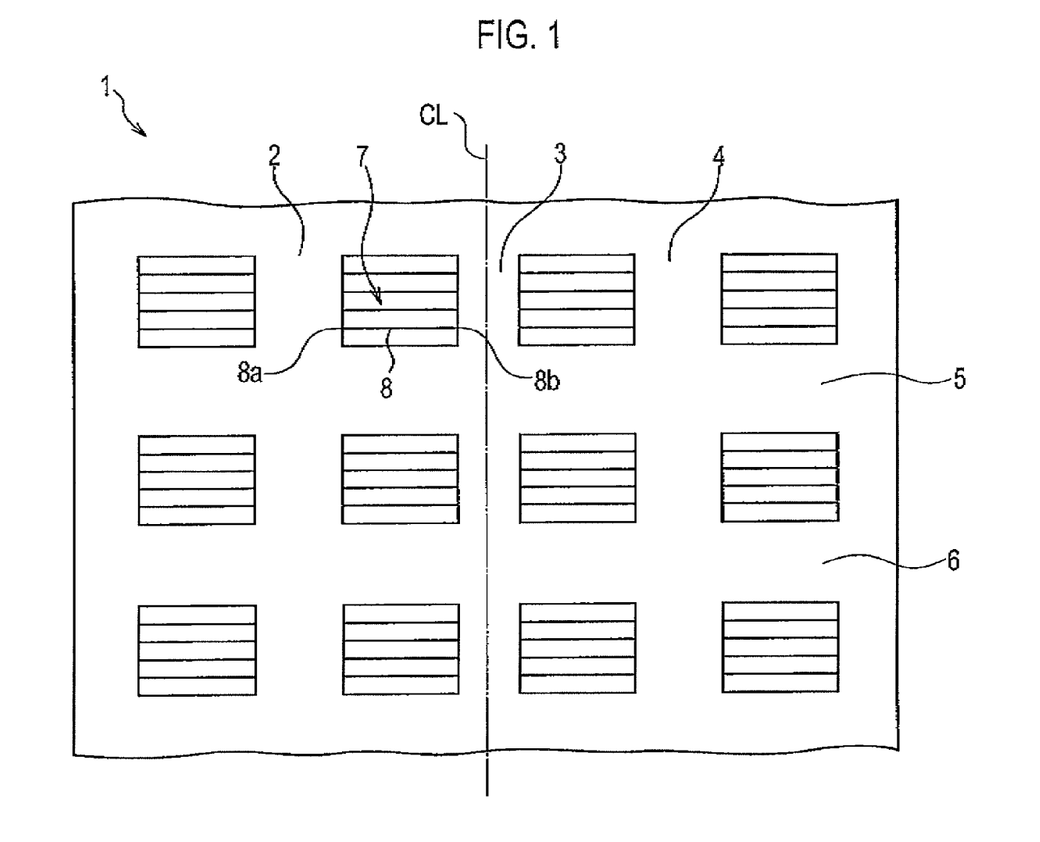
FIG. 1 shows a tread pattern of a pneumatic tire according to a first embodiment of the present invention.

FIG. 1 shows a tread pattern of a pneumatic tire according to a first embodiment of the present invention.

As shown in FIG. 1, a tread section of the pneumatic tire 1 is provided with multiple circumferential grooves 2, 3, 4 extending in the tire circumferential direction and multiple lateral grooves 5, 6 extending in the tread width direction, and multiple land blocks 7 are defined by the circumferential grooves 2 to 4 and the lateral grooves 5, 6. Each of the land blocks 7 is provided with multiple sipes 8 extending in the tread width direction. In this embodiment, for one land block 7, the four sipes 8 extend in the tread width direction and are arranged at even intervals in the tire circumferential direction. Moreover, ends in the width direction 8a, 8b of each of the sipes 8 reach sidewalls of the land blocks 7, respectively, and communicate with the circumferential grooves 2.

Figure 2:
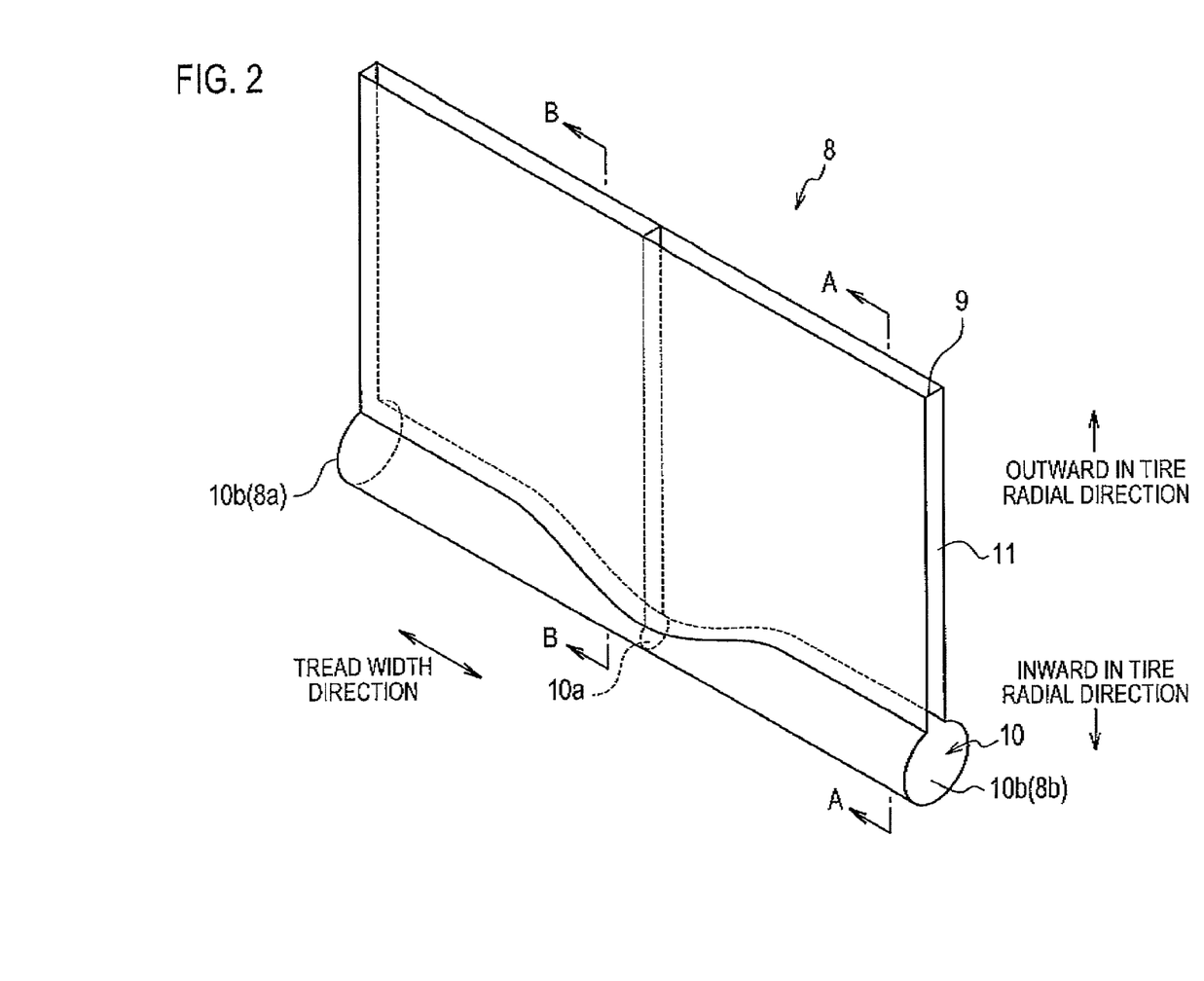
FIG. 2 is a perspective view formally showing a sipe according to the first embodiment of the present invention.
Figure 3:
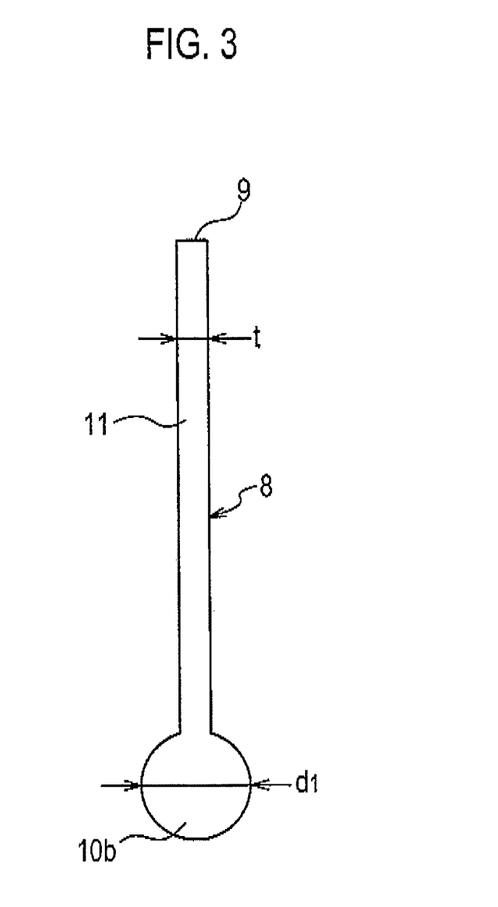
FIG. 3 is a cross-sectional view taken along a line A-A in FIG. 2.
Figure 4:
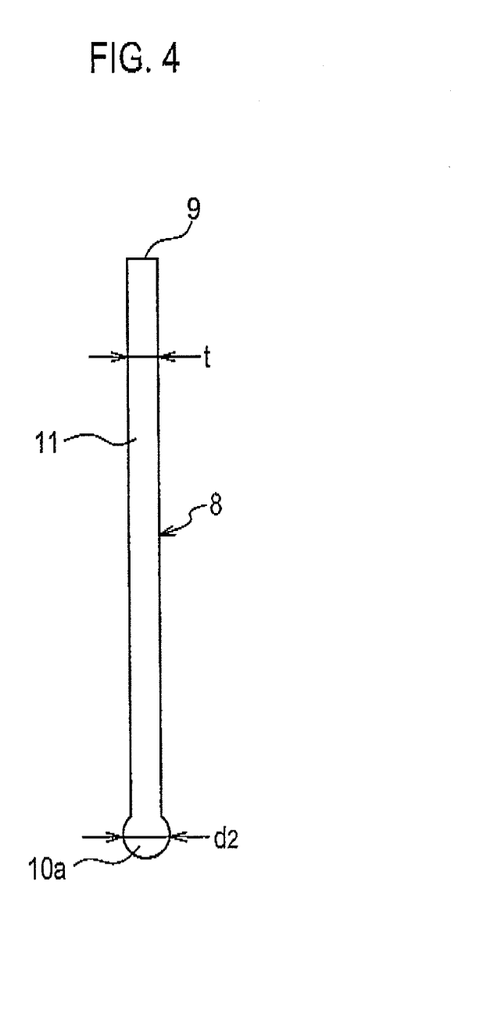
FIG. 4 is a cross-sectional view taken along a line B-B in FIG. 2.

FIG. 2 is a perspective view formally showing a sipe according to the first embodiment of the present invention; FIG. 3 is a cross-sectional view taken along a line A-A in FIG. 2; and FIG. 4 is a cross-sectional view taken along a line B-B in FIG. 2.

Here, the sipe 8 is a space with no physical form, to be exact, and actually, FIG. 2 shows a shape of a blade (tooth) when forming the sipe 8. However, to clarify the shape of the sipe, the sipe is shown formally as in FIGS. 2 and 5.

As shown in FIG. 2, the sipe 8 is formed along the tire radial direction (depth direction) from a radially outer end 9 to an expanded diameter section 10 on an inner end of the sipe in the tire radial direction. As shown in FIGS. 2 and 3, the radially outer end of the sipe 8 corresponds to a position of a tread surface of the land block 7, and the sipe 8 is integrally formed of a main body portion 11 allocated on the radially outer side and of the expanded diameter section 10 formed on the inner end in the tire radial direction of the main body portion 11.

The expanded diameter section 10 is smallest in diameter at an expanded diameter section 10a in a center portion thereof in the tread width direction. The expanded diameter section 10 increases in diameter gradually and smoothly extending toward the both sides thereof in the width direction, and is largest in diameter in sidewall portions of the land block 7. An expanded diameter section 10b on the both sides of the expanded diameter section 10 in the width direction communicates with a circumferential groove 2 contiguous with the land block 7. Note that it is preferable that the both sides in the width direction of the expanded diameter section 10 having a large diameter are each set to be a length ranging from 10% to 35 of the entire length of the expanded diameter section 10 from the both ends of the expanded diameter section 10 in the longitudinal direction thereof.

In addition, as shown in FIG. 3, the thickness t of the main body portion 11 is, for example, preferably 0.4 mm, and the diameter d 1 of the expanded diameter section 10b is preferably 1.2 t to 3.0 t. Further, the diameter d1 of the expanded diameter section 10a is preferably 1.0 t to 1.2 t.

Advantageous effects of this embodiment are described below.

The pneumatic tire of this embodiment is a pneumatic tire having the tread section provided with the circumferential grooves 2 to 4 extending in the tire circumferential direction, the lateral grooves 5, 6 extending in the tread width direction, and the multiple land blocks 7 defined by these circumferential grooves 2 to 4 and lateral grooves 5, 6, each of the land blocks 7 provided with the sipes 8 formed to extend to a predetermined depth from the tread surface inward in the tire radial direction, each of the sipes 8 having an end portion which communicates with at least any one of the circumferential grooves 2 to 4 and the lateral grooves 5, 6. At least one of the multiple sipes 8 includes the expanded diameter section 10 on the inner end of the sipe in the tire radial direction, and the expanded diameter section 10 is formed to increase in diameter extending toward each of the sidewalls of the land block 7.

According to this embodiment, the expanded diameter section 10 is formed not in an intermediate portion in the depth direction of the sipe 8 but in the inner end portion in the radial direction, and thus occurrence of a crack is prevented even when a load is input to the sipe 8 as well as a drainage effect is obtained when travelling on icy roads. Moreover, the expanded diameter section 10 increases in diameter extending toward each of the sidewalls of the land block, and thus the effect of draining water from the end portions of the expanded diameter section 10 in the longitudinal direction thereof is improved.

In other words, the expanded diameter section 10 is made smaller in diameter at the center portion in the longitudinal direction thereof than at the both end sides thereof, and thereby increasing hydraulic pressure at the center portion compared with the both end sides when the sipe 8 absorbs water. Accordingly, the water absorbed in the expanded diameter section 10 flows to the both end sides to be drained, and thereby improving tire performance on ice. According to this embodiment, a crack prevention effect of the sipe is obtained while the drainage effect of the sipe is maintained.

Since the sipe 8 extends in the tread width direction, the radially outer end of the sipe opens during travelling, and the drainage effect draining water out of the radially outer end is further improved.

[Second Embodiment]

Next, a second embodiment of the present invention is described. Components which are the same as those of the first embodiment will be denoted with the same reference numerals, and descriptions for such components will be omitted.

Figure 5:
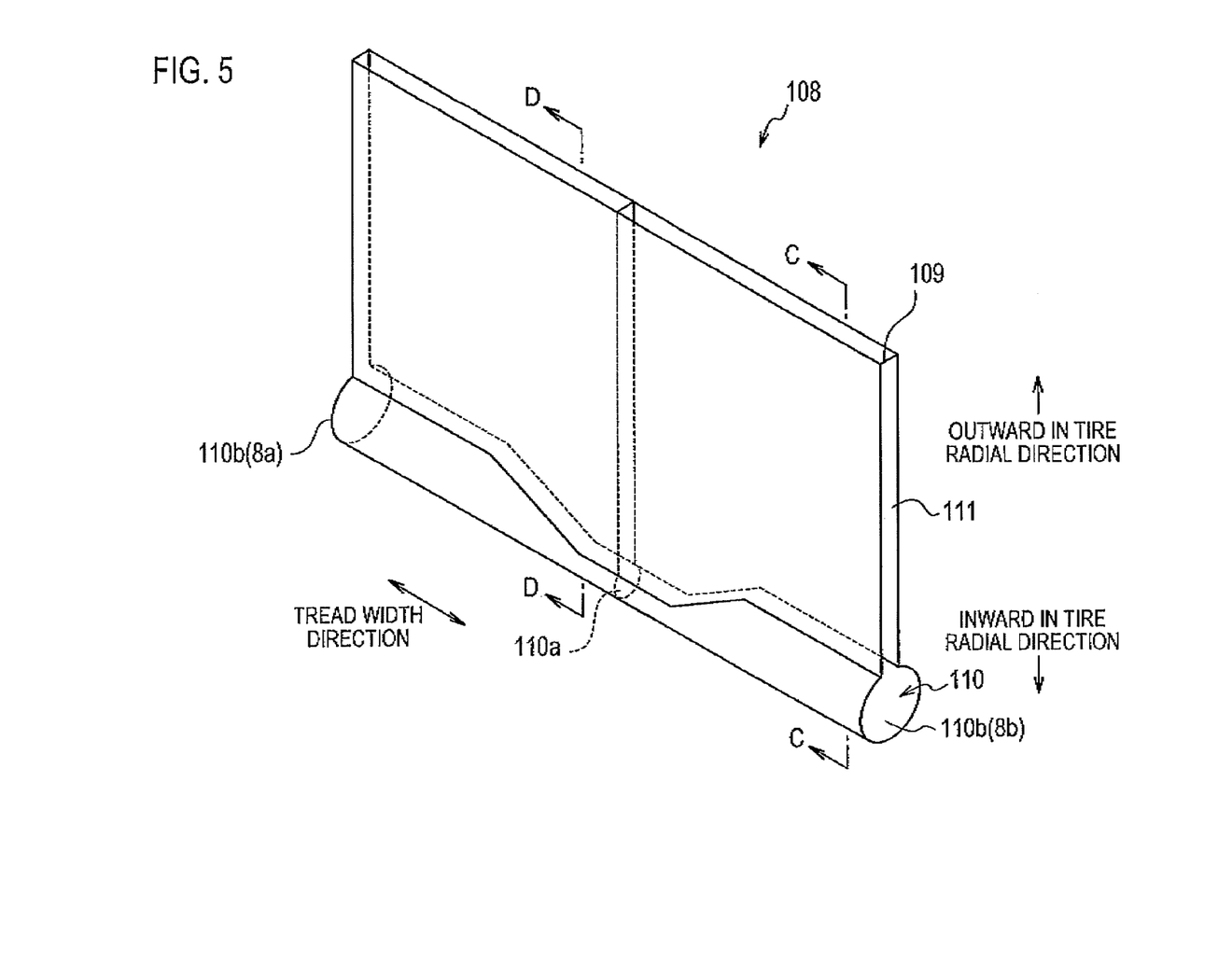
FIG. 5 is a perspective view formally showing a sipe according to the second embodiment of the present invention.
Figure 6:
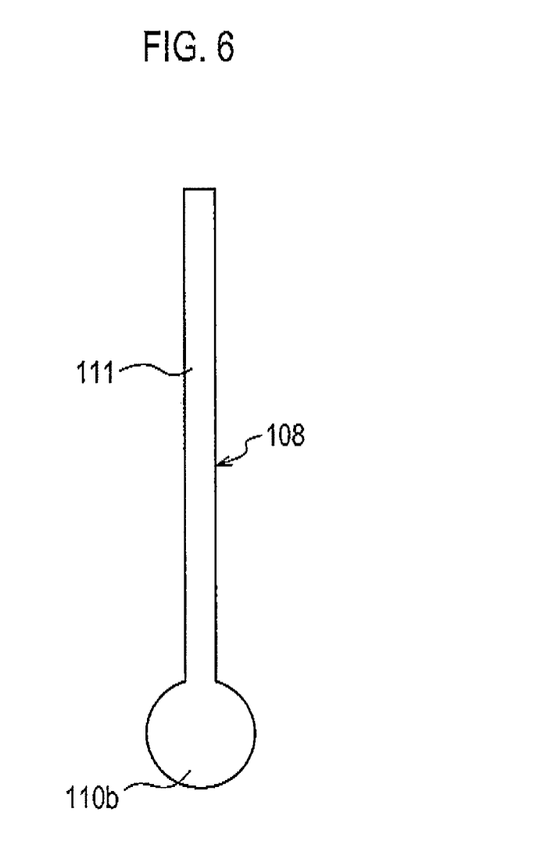
FIG. 6 is a cross-sectional view taken along a line C-C in FIG. 5.
Figure 7:
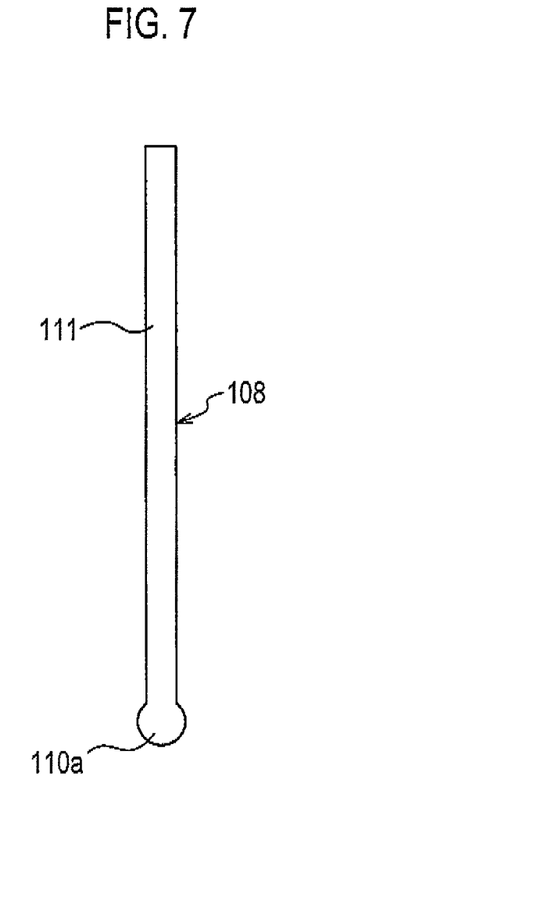
FIG. 7 is a cross-sectional view taken along a line D-D in FIG. 5.

FIG. 5 is a perspective view formally showing a sipe according to the second embodiment of the present invention; FIG. 6 is a cross-sectional view taken along a line C-C in FIG. 5; and FIG. 7 is a cross-sectional view taken along a line D-D in FIG. 5.

A sipe 108 according to this embodiment, unlike the sipe 8 in the first embodiment, does not smoothly curve in a border region between the center portion of the expanded diameter section in the width direction thereof and each of the both end sides of the expanded diameter section in the width direction thereof, but is formed to bend in a substantially linear shape in a side view.

In this embodiment also, the sipe 108 is formed along the tire radial direction (depth direction) from a radially outer end 109 to an inner end in the tire radial direction. As shown in FIGS. 5 to 7, the radially outer end of the sipe 108 corresponds to a position in the radial direction of a tread surface of a land block 7, and the sipe 108 is integrally formed of a main body portion 111 allocated on the radially outer side and of the expanded diameter section 110 formed on the inner end in the tire radial direction of the main body portion 111.

The expanded diameter section 110 is integrally formed of a small diameter portion 110a in the center portion of the expanded diameter section 110 having a small diameter and large diameter portions 110b on the both sides of the expanded diameter section 110 having a large diameter.

According to this embodiment also, the crack prevention effect of the sipe is obtained while the drainage effect of the sipe is maintained.

It should not be understood that the description and drawings which constitute part of the disclosure of the embodiments described above limit the present invention. From this disclosure, various alternative embodiments, examples, and operation techniques will be easily found by those skilled in the art.

For example, the sipe is formed along the tread width direction in the first and second embodiments; however the sipe may be formed along the tire circumferential direction. In addition, the number of sipes in one land block is not limited to four, and may be other than four. Moreover, the expanded diameter section needs to be provided in at least one sips.

When the sipe is formed along the tire circumferential direction, direction of load input to the sipe at the time of tire rolling is orthogonal to a sipe extending direction, and thus even when the number of sipes is increased, a high drainage effect is obtained while rigidity of the land block 7 is maintained.

EXAMPLE 1

Next, the present invention is described more specifically through an example.

A pneumatic tire with a size of 195/65R15 was used as a test tire for a conventional example, a comparative example, and an inventive example. Five block rows were arranged in parallel in the tread width direction, and each land block had a rectangular shape in a planar view. Each block row had 60 land blocks arranged in the tire circumferential direction. Each land block had three sipes extending along the tread width direction across the entire width of the land block. A sipe depth was 10 mm, and a sipe depth was 7 mm. In addition, the sipe according to the conventional example was a conventional type sipe formed along the radial direction to have a uniform thickness. The sipe according to the comparative example had an expanded diameter section provided on the inner end of the sipe in the tire radial direction, the expanded diameter section having a circular-shaped cross section. The diameter of the expanded diameter section was made twice as large as (200% of) the thickness of the main body portion. The sipe according to the inventive example was a sipe having a shape shown in FIG. 5. The diameter of the large diameter portions on the both sides in the longitudinal direction of the expanded diameter section was 0.7 mm, which was 1.75 times as large as (175% of) the diameter (0.42 mm) of the small diameter portion in the center portion in the longitudinal direction of the expanded diameter section. The diameter of the small diameter portion in the center portion in the longitudinal direction of the expanded diameter section was 105% of the diameter of the main body portion.

These test tires were mounted on rim wheels having a rim width of 15×6 J inches. Air was filled in the tires so that the internal pressure thereof was 210 kPa, and then the tires were attached to a test vehicle (vehicle name: Toyota Corolla (trademark)). The vehicle was run and a brake was locked at an initial speed of 20 km/h to measure a braking distance. Table 1 shows a result obtained by correcting the speed and the braking distance and then converting the corrected values into a frictional resistance coefficient to create an index. In Table 1, "Range of Both Ends of Large Diameter Sections" represents a percentage (%) obtained by dividing the length of a large diameter portion 110b shown in FIG. 5 in the longitudinal direction thereof by the entire length of the expanded diameter section.

TABLE 1

| | Range of Both Ends of Large Diameter Sections (%) | Braking Friction Coefficient Index (%) |
|---|---|---|
| Conventional Example | — | 100 |
| Comparative Example | — | 105 |
| Inventive Example | 35 | 109 |

These results ensure that the braking friction coefficient index of the inventive example is larger than that of the conventional example and that of the comparative example, and the inventive example has an improved tire performance on ice.

[Third Embodiment]

Structure of Pneumatic Tire

Figure 8:
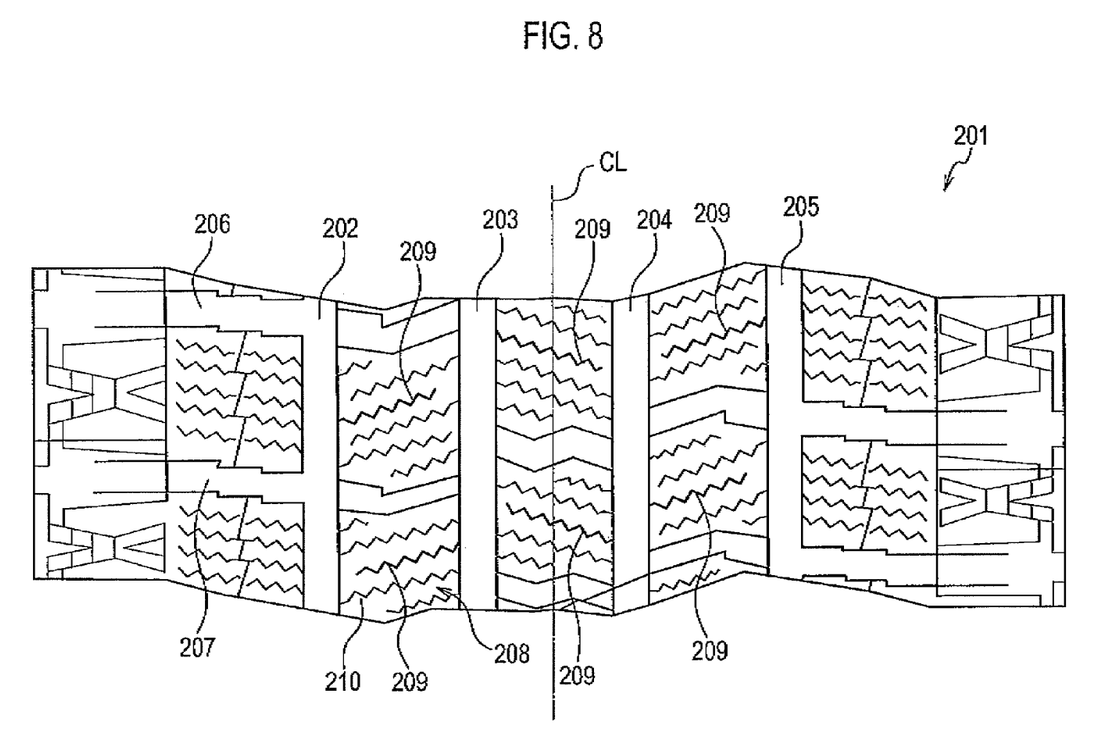
FIG. 8 shows a tread pattern of a pneumatic tire according to an embodiment of the present invention.

FIG. 8 shows a tread pattern of a pneumatic tire according to an embodiment of the present invention. Note that an internal structure of the pneumatic tire according to the embodiment is the same as that of a general tire including a carcass layer, a belt layer, and the like.

As shown in FIG. 8, in a tread section of a pneumatic tire 201, multiple land blocks 208 are defined by circumferential grooves 202, 203, 204, 205 extending in the tire circumferential direction and lateral grooves 206, 207 extending in the tread width direction. An expanded diameter sipe 209 and general sipes 210 extending in the tread width direction are provided in each of the land blocks 208.

In this embodiment, for each land block 208, the expanded diameter sipe 209 and the general sipes 210 are formed along the tread width direction and arranged at substantially equal intervals in the tire circumferential direction. The expanded diameter sipe 209 and the general sipes 210 extend from a tread surface to a predetermined depth inward in the tire radial direction. At least one end of each of the expanded diameter sipe 209 and the general sipes 210 in the tread width direction reaches a sidewall of the land block 208, and communicate with a circumferential groove 202 to 205.

One expanded diameter sipe 209 is formed in each land block 208, and includes an expanded diameter section 212 to be described later. The expanded diameter sipe 209 is arranged in the center portion of the land block 208 in the tire circumferential direction. In contrast, the multiple general sipes 210 other than the expanded diameter sipe 209 are formed in the land block 208, and do not include the expanded diameter section 212.

(Structure of Expanded Diameter Sipe)

Figure 9:
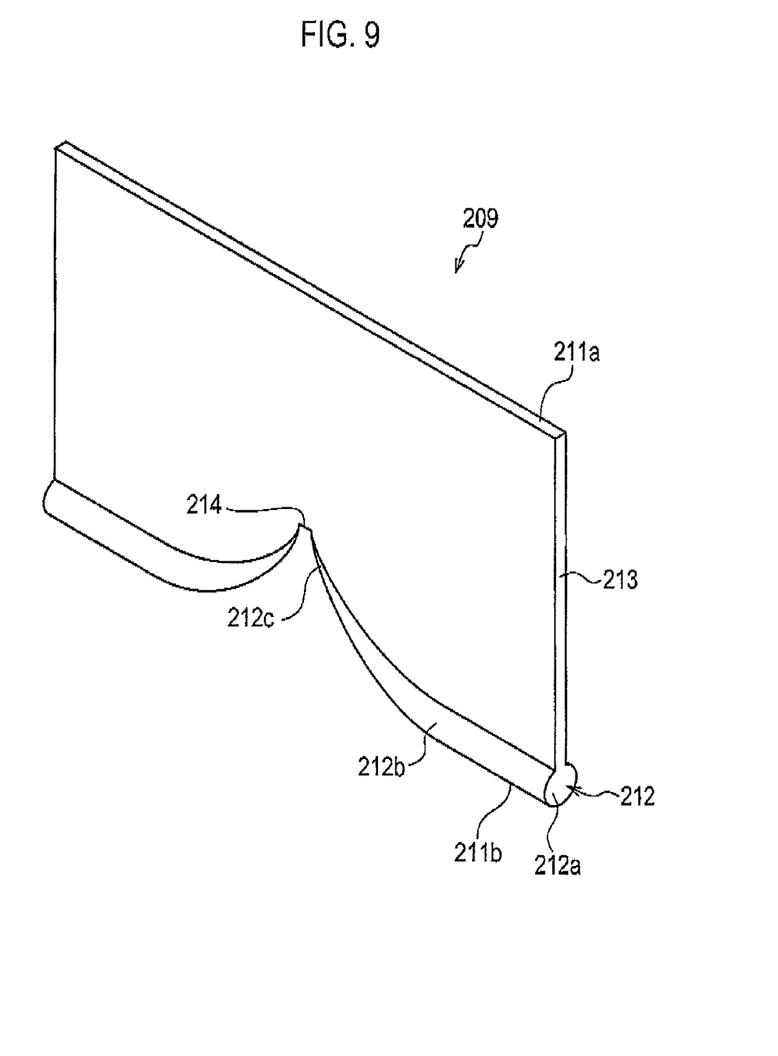
FIG. 9 is a perspective view formally showing a sipe according to an embodiment of the present invention.
Figure 10:
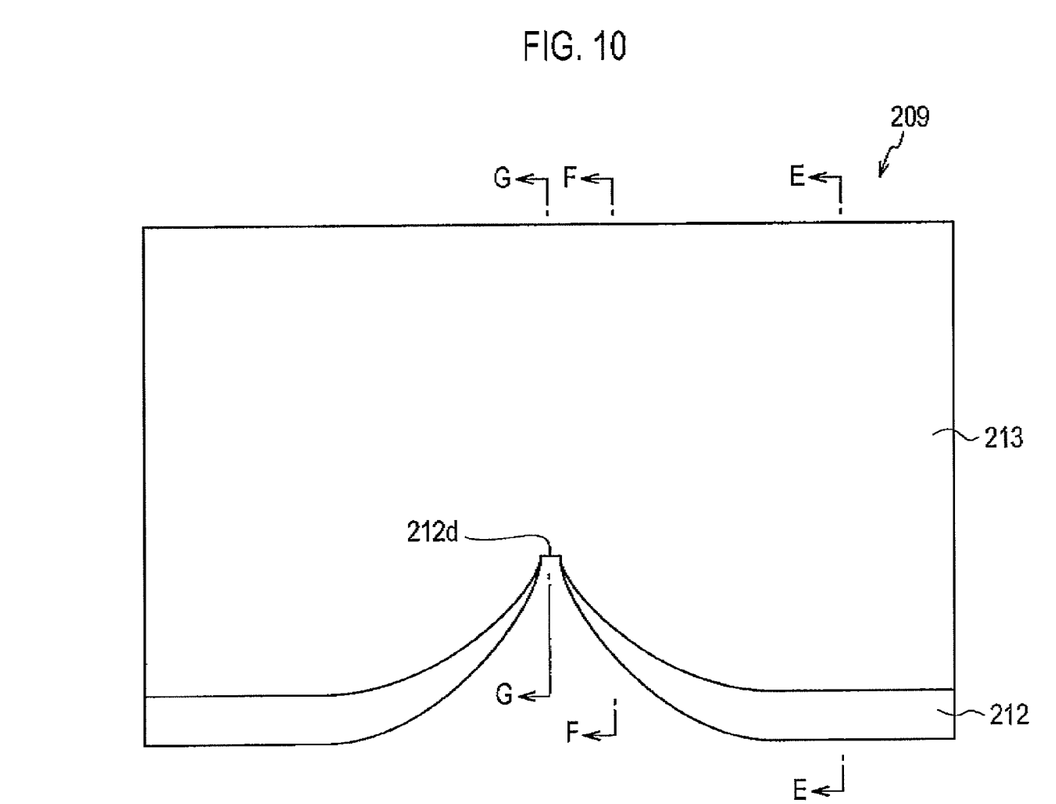
FIG. 10 is a front view of FIG. 9.
Figure 11:
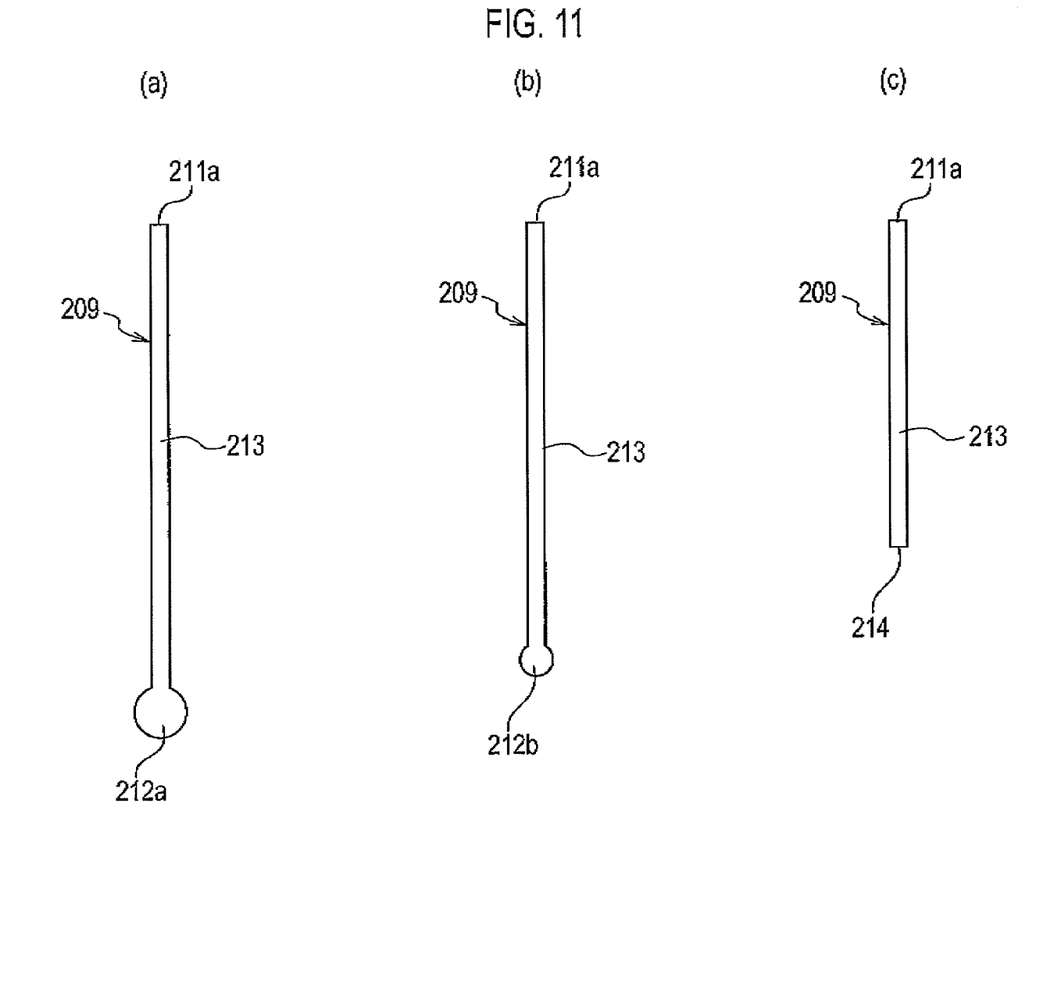
FIG. 11(a) is a cross-sectional view taken along a line E-E in FIG. 10.
FIG. 11(b) is a cross-sectional view taken along a line F-F in FIG. 10.
FIG. 11(c) is a cross-sectional view taken along a line G-G in FIG. 10.

FIG. 9 is a perspective view formally showing a sipe according to an embodiment of the present invention; FIG. 10 is a front view of FIG. 9; FIG. 11(a) is a cross-sectional view taken along a line E-E in FIG. 10; FIG. 11(b) is a cross-sectional view taken along a line F-F in FIG. 10; and FIG. 11(c) is a cross-sectional view taken along a line G-G in FIG. 10.

Here, the expanded diameter sipe 209 is a space with no physical form, to be exact, and actually, FIGS. 9 to 12 show a shape of a blade (tooth) when forming the expanded diameter sipe 209. However, to clarify the shape of the expanded diameter sipe 209, the expanded diameter sipe 209 is shown formally as in FIGS. 9 to 12.

As shown in 9 and 10, an outer end of the sipe in the tire radial direction (hereinafter referred to as a radial outer end 211a) of the expanded diameter sipe 209 corresponds to a position of a tread surface of the land block 208. The expanded diameter sipe 209 is integrally provided with a main body portion 213 allocated on the outer side in the tire radial direction and with the expanded diameter section 212 (expanded diameter section) formed on the inner end in the tire radial direction (hereinafter referred to as a radial inner end 211b) of the main body portion 213.

Moreover, in the bottom portion of the expanded diameter sipe 209, a shallow bottom portion 214 where the depth of the sipe 209 is smallest is provided in the center portion of the expanded diameter sipe 209 in the longitudinal direction thereof. The expanded diameter section 212 is not formed in the shallow bottom portion 214.

The expanded diameter section 212 is formed by increasing a sipe width on the radially inner end 211b. The expanded diameter Section 212 extends from the shallow bottom portion 214 toward each of the sidewalls of the land block 208. The expanded diameter section 212 is shaped like a circle in a cross section intersecting at right angle a longitudinal direction of the expanded diameter sipe 209 in a plan view of the tread surface.

In addition, as the expanded diameter section 212 extends from the shallow bottom portion 214 toward each sidewall of the land block 208, the sipe depth of the expanded diameter sipe 209 gradually becomes larger. In other words, as shown in FIG. 10, the expanded diameter section 212 is formed symmetrically about the center of the shallow bottom portion 214 when the expanded diameter sipe 209 is viewed from the front. The inner end of the sipe in the tire radial direction (lower end) of the expanded diameter section 212 curves from the shallow bottom portion 214 toward the sidewall of the land block 208.

The expanded diameter section 212 gradually increases in diameter extending from the shallow bottom portion 214 toward the sidewall of the land block 208. In other words, the expanded diameter section 212 gradually decreases in diameter extending from the sidewall of the land block 208 toward the shallow bottom portion 214.

Specifically, as shown in FIG. 11(a), in the expanded diameter sipe 209, the length of the main body portion 213 in the tire radial direction is largest and the diameter of the expanded diameter section 212 is largest on sidewall sides 12a near the sidewalls of the land block 208. As shown in FIG. 11(b), at an intermediate portion 12b between each of the sidewall sides 12a and the shallow bottom portion 214, the length of the main body portion 213 in the tire radial direction is smaller than that of the sidewall side 12a, and the diameter of the expanded diameter section 212 is made smaller. As shown in FIG. 11(c), at the shallow bottom portion 214, the length of the main body portion 213 in the tire radial direction is smallest, and the expanded diameter section 212 is not formed. In other words, the expanded diameter section 212 gradually decreases in diameter extending from the sidewall side 12a through the intermediate portion 12b toward a center end 12c.

(Operations and Effects)

A sipe described in Japanese Patent Application Publication No. 2006-298057 includes an extended diameter section formed by increasing the sipe width thereof at a depth ranging from 20% to 90% of the sipe depth. This expanded diameter section facilitates the sipe to absorb rainwater between an icy road surface and the tread surface.

However, in the case of the sipe having a conventional structure, the expanded diameter section is formed in a region ranging from 20% to 90% of the sipe depth, and thus drainage function of draining rainwater absorbed in the sipe is lowered during travelling on icy roads.

In this embodiment, the expanded diameter sipe 209 includes the expanded diameter section 212 formed by increasing the sipe width on the radially inner end 211b. Thus, compared with a sipe having no expanded diameter section 212, the expanded diameter sipe 209 easily absorbs rainwater and the like between an icy road surface and the tread surface in the expanded diameter section 212. In other words, absorption function is improved.

Moreover, in the bottom portion of the expanded diameter sipe 209, the shallow bottom portion 214 where the depth of the sipe 209 is smallest is formed in the center portion of the expanded diameter sipe 209 in the longitudinal direction thereof. Thus, rainwater and the like standing in the center portion easily flow from the shallow bottom portion 214 toward the sidewalls of the land block 208, and thereby improving the drainage function. In addition, the rigidity of the land block 208 around a center portion in the longitudinal direction thereof improves, and thereby also improving tire performance on ice (various travelling performances such as drivability and drive/braking performance).

Further, the expanded diameter section 212 increases in diameter extending from the shallow bottom portion 214 toward each of the sidewalls of the land block 208. Thus, the expanded diameter section 212 is made smaller in diameter at the center portion in the longitudinal direction thereof than at the both end sides thereof, and thereby increasing hydraulic pressure at the center portion compared with the both end sides when the expanded diameter sipe 209 absorbs rainwater and the like. Accordingly, the rainwater and the like absorbed in the expanded diameter section 212 flow to the both end sides to be drained, and thereby more surely improving drainage function.

As described above, the pneumatic tire can be provided which achieves absorption function and drainage function at a high level at the same time as well as improves tire performance on ice.

In this embodiment, as the expanded diameter section 212 extends from the shallow bottom portion 214 toward each sidewall of the land block 208, the sipe depth gradually becomes larger. Thus, rainwater and the like gradually flow from the shallow bottom portion 214 toward the sidewalls of the land block 208, and thereby more surely improving the drainage function.

In this embodiment, the expanded diameter sipe 209 extends in the tread width direction. Thus, the radially outer end 211 of the expanded diameter sipe 209 opens during travelling, and rainwater and the like absorbed in the expanded diameter sipe 209 are drained from the radially outer end 211. Thereby, the drainage effect is more surely improved. In addition, an effect that an edge of the expanded diameter sipe 209 grips a road surface (a so-called edge effect) can be increased, and thereby further improving tire performance on ice.

In this embodiment, the expanded diameter section 212 gradually increases in diameter extending from the shallow bottom portion 214 toward each of the sidewalls of the land block 208. Thus, rainwater and the like smoothly flow from the shallow bottom portion 214 toward the sidewalls of the land block 208, and thereby further improving drainage function.

In this embodiment, the expanded diameter sipe 209 is shaped like a circle in a cross section intersecting at right angle a longitudinal direction of the expanded diameter sipe in a plan view of the tread surface. Thus, compared with the case where the expanded diameter sipe 209 is shaped like a quadrangle, concentration of the input to the radially inner end 211b due to the load applied to the land block 208 is reduced. Accordingly, occurrence of a crack on the radially inner end 211b is prevented, as well as absorption function and drainage function are achieved at a high level at the same time.

Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, the third embodiment of the present invention can be modified as follows. Specifically, the expanded diameter sipe 209 is described as the one formed along the tread width direction; however the expanded diameter sipe 209 is not limited to this, and may be formed along the tire circumferential direction. In this case, the direction of the input of the load applied to the land blocks 208 is perpendicular to an extending direction of the expanded diameter sipe 209, and thus the rigidity of the land blocks 208 is maintained and a high drainage effect can be obtained even when the number of sipes is increased.

Figure 12:
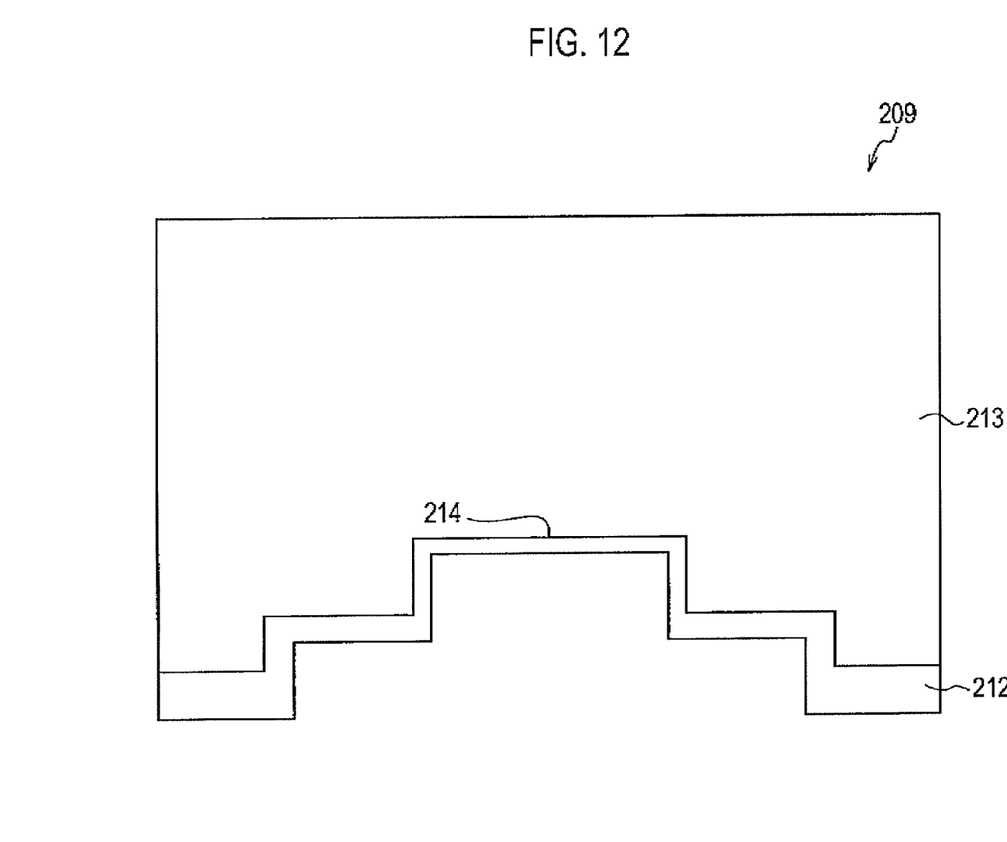
FIG. 12 is a front view formally showing a sipe according to an embodiment of the present invention.

Moreover, the expanded diameter section 212 is described as the one which gradually increases in diameter extending from the shallow bottom portion 214 toward each of the sidewalls of the land block 208; however the expanded diameter section 212 is not limited to this. In addition, the expanded diameter section 212 is described as the one formed such that the sipe depth of the expanded diameter sipe 209 gradually becomes larger as the expanded diameter section 212 extends from the shallow bottom portion 214 toward each sidewall of the land block 208; however the expanded diameter section 212 is not limited to this. For example, the expanded diameter section 212 only needs to increase in diameter extending from the shallow bottom portion 214 toward each sidewall of the land block 208, and the expanded diameter section 212 may be in a step-wise shape extending from the shallow bottom portion 214 toward each sidewall of the land block 208, as shown in FIG. 12. In addition, the expanded diameter sipe 209 may be formed such that the sipe width gradually increases as the expanded diameter sipe 209 extends from the radially outer end 211a toward the radially inner end 211b.

Further, the expanded diameter section 212 (expanded diameter section) is described as the one formed in a circular shape, but is not limited to this. For example, the expanded diameter section 212 may be in a triangular, quadrangular, or trapezoidal shape.

As described above, the present invention naturally includes various embodiments which are not described herein. Accordingly, the technical scope of the present invention should be determined only by the matters to define the invention in the scope of claims as appropriate based on the description above.

EXAMPLE 2

Next, the third embodiment is described more specifically through an example.

An on-ice friction coefficient was measured for each of sample pieces of the comparative example and the inventive example using an indoor on-ice turntable, and the measured values were compared with each other.

The test conditions were set as follows. The temperature was −2° C.; the rotational speed of the turntable was equivalent to the vehicle travelling speed of 10 km/h; and the pressure load of the sample piece to the turntable was equivalent to the tire load of 190 N.

The sample piece of the comparative example had the following structure. The expanded diameter section was formed on the radially inner end of the sipe; the diameter of the expanded diameter section was uniform along the longitudinal direction thereof; and the position of the expanded diameter section in the radial direction was constant. On the other hand, the sample piece of the inventive example had the following structure. The expanded diameter section was formed on the radially inner end of the sipe; the expanded diameter section gradually changed in diameter along the longitudinal direction thereof; and a sipe center land portion was formed in the center portion.

As a result, the tire performance on ice of the sample piece of the inventive example was 103 (index) while the tire performance on ice of the sample piece of the comparative example was 100 (index) as a reference. These results ensured that the tire performance on ice of the inventive example was improved compared with that of the comparative example.

Note that the entire contents of Japanese Patent Application No. 2009-241439 (filed on Oct. 20, 2009) and Japanese Patent Application No. 2009263281 (filed on Nov. 18, 2009) are incorporated herein by reference.

Industrial Applicability

As described above, the pneumatic tire according to the present invention has a high drainage effect while keeping a crack prevention effect of the ripe, and thus the present invention is useful particularly for a pneumatic tire for travelling on icy roads.

The invention claimed is:

1. A pneumatic tire including a tread section provided with circumferential grooves extending in a tire circumferential direction, lateral grooves extending in a tread width direction, and a plurality of land blocks defined by the circumferential grooves and the lateral grooves, each of the land blocks provided with a plurality of sipes formed to extend to a predetermined depth from a tread surface inward in a tire radial direction, each of the sipes having an end portion communicating with at least any one of the circumferential grooves and the lateral grooves, wherein
    at least one of the plurality of sipes includes an expanded diameter section on an inner end of the sipe in the tire radial direction,
    the expanded diameter section is smallest in diameter in a center portion thereof and largest in diameter in side portions thereof,
    the center portion of the expanded diameter section is formed to increase in diameter gradually and smoothly toward each of sidewalls of the land block, and
    each side portion of the expanded diameter section has a substantially constant diameter along a length of 10% to 35% of the entire length of the expanded diameter section from both ends of the expanded diameter section in the longitudinal direction thereof.

2. The pneumatic tire according to claim 1, wherein each sipe extends in the tread width direction.

3. The pneumatic tire according to claim 1, wherein the sipe extends in the tire circumferential direction.

4. A pneumatic tire including a plurality of land blocks defined by circumferential grooves extending in a tire circumferential direction and lateral grooves extending in a tread width direction, each of the land blocks provided with a plurality of sipes formed to extend to a predetermined depth from a tread surface inward in a tire radial direction, each of the sipes having an end portion communicating with at least any one of the circumferential grooves and the lateral grooves, at least one of the plurality of sipes including an expanded diameter section on an inner end of the sipe in the tire radial direction, the expanded diameter section formed by increasing a width of the sipe, wherein
    in a bottom portion of the sipe, a shallow bottom portion where the depth of the sipe is smallest is formed in a center portion of the sipe in a longitudinal direction thereof,
    the expanded diameter section is smallest in diameter in a center portion thereof and largest in diameter in side portions thereof,
    in the center portion of the expanded diameter section, the expanded diameter section curves and extends from the shallow bottom portion toward each of sidewalls of the land block, and increases gradually in size from the shallow bottom portion toward each of the sidewalls of the land block, and
    each side portion of the expanded diameter section has a substantially constant diameter along a length of 10% to 35% of the entire length of the expanded diameter section from both ends of the expanded diameter section in the longitudinal direction thereof.

5. The pneumatic tire according to claim 4, wherein as the expanded diameter section extends from the shallow bottom portion toward the sidewall of the land block, the sipe depth gradually becomes larger.

6. The pneumatic tire according to claim 4, wherein the sipe extends in the tread width direction.

7. The pneumatic tire according to claim 4, wherein the sipe extends in the tire circumferential direction.

8. The pneumatic tire according to claim 4, wherein the expanded diameter section gradually increases in diameter extending from the shallow bottom portion toward each of the sidewalls of the land block.

9. The pneumatic tire according to claim 4, wherein the expanded diameter section is shaped like a circle in a cross section intersecting at right angles a longitudinal direction of the sipe in a plan view of the tread surface.

* * * * *